F. D. SHINDEL.
STORAGE BATTERY AND BOX.
APPLICATION FILED FEB. 9, 1916.
1,200,994.
Patented Oct. 10, 1916.
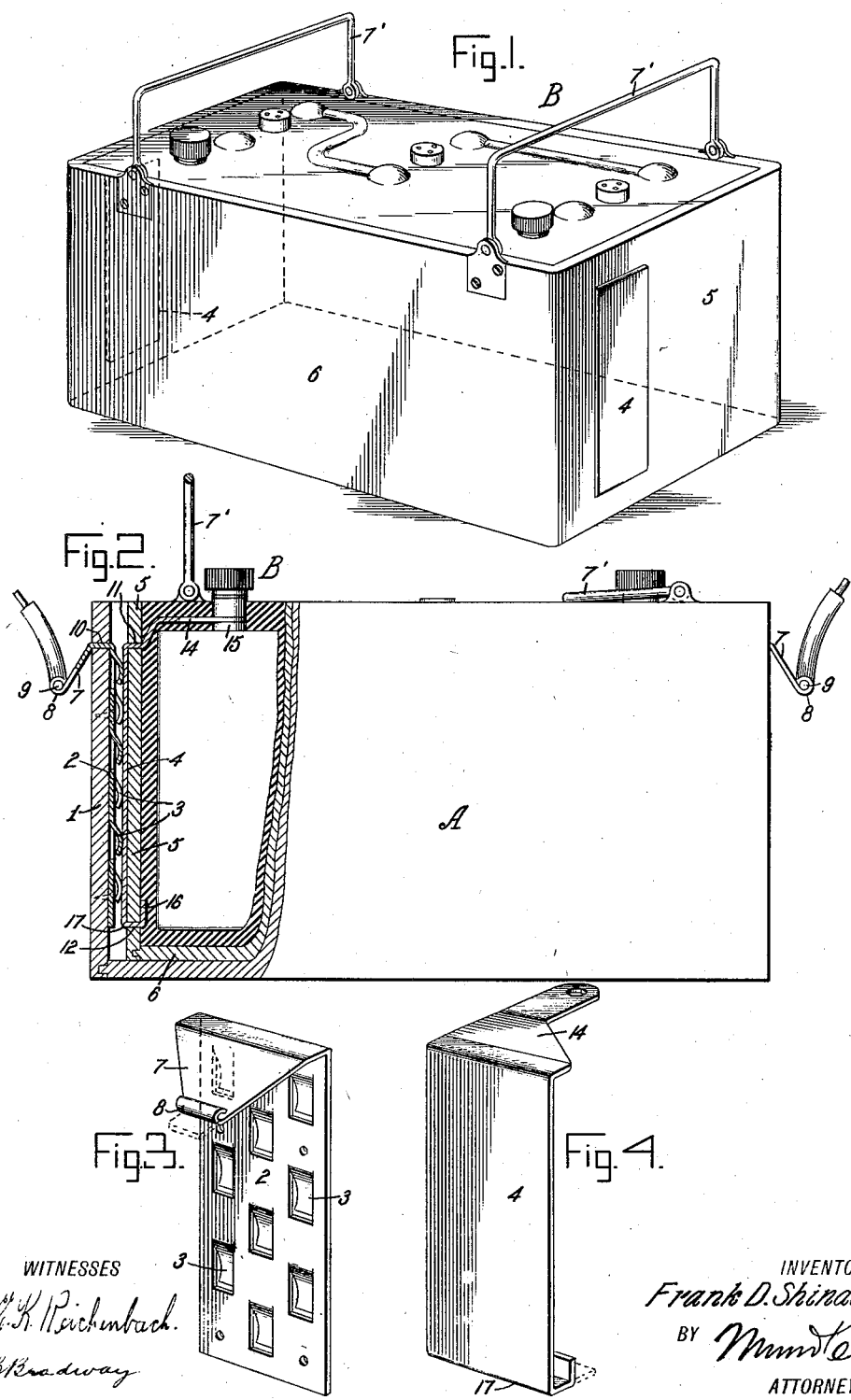
WITNESSES
INVENTOR
Frank D. Shindel
BY
ATTORNEYS

UNITED STATES PATENT OFFICE.

FRANK D. SHINDEL, OF NORTHAMPTON, PENNSYLVANIA.

STORAGE BATTERY AND BOX.

1,200,994.  Specification of Letters Patent.  Patented Oct. 10, 1916.

Application filed February 9, 1916. Serial No. 77,163.

*To all whom it may concern:*

Be it known that I, FRANK D. SHINDEL, a citizen of the United States, and a resident of Northampton, in the county of Northampton and State of Pennsylvania, have invented a new and Improved Storage Battery and Box, of which the following is a full, clear, and exact description.

This invention relates to storage batteries and deals more particularly with terminal connecting devices.

The invention has for its general objects to improve and simplify the construction of storage battery terminal connectors so as to overcome the objections inherent in the terminal connectors at present in use.

In the ordinary means for connecting cables or circuit wires to the battery terminals, lugs and nuts are employed, thus requiring tools for making the mechanical connection or disconnection, conducing to poor or high resistance joints by reason of dirt, corrosion or other foreign matter, rendering the removal of the battery difficult, and making possible accidental short circuits.

A specific object of the invention is to provide connecting devices for the terminals, whereby the insertion of the battery into its box or the removal thereof will automatically make or break the terminal connections without the use of tools or without the objections hereinbefore noted. The terminal connecting means comprise plates on the outer surfaces of the container of the battery and plates on the inner surfaces of the ends of the battery box, which latter plates have a plurality of spring contact tongues which have a wiping engagement with the plates on the battery container, so that positive current-conducting connections are provided, which, by reason of the numerous tongues, are of low negligible resistance, and the plates on the battery box have portions extending out of the same for receiving the cables or circuit wires.

With such objects in view, and others which will appear as the description proceeds, the invention comprises various novel features of construction and arrangement of parts which will be set forth with particularity in the following description and claims appended hereto.

In the accompanying drawing, which illutrates one embodiment of the invention and wherein similar characters of reference indicate corresponding parts in all the views, Figure 1 is a perspective view of a battery removed from its box; Fig. 2 is a side view of a battery and box with portions broken away to illustrate one of the terminal connectors; and Figs. 3 and 4 are perspective views of the plates that form a terminal connector.

In the present instance the battery is of that type which is commonly used in automobiles for starting and lighting systems, but it is adapted for other uses, and the invention is also applicable to other styles of batteries and battery boxes than that shown.

Referring to the drawing A designates a box of any suitable construction in which is adapted to be contained a battery B. On the inner surfaces of the end walls 1 of the box A are metal plates 2 which are secured by suitable fastenings, and on these plates are closely arranged downwardly and inwardly extending spring tongues 3 formed by being stamped out of metal. These spring tongues are adapted to engage plates 4 on the outer surfaces of the end walls 5 of the container or casing 6 of the battery. The container 6 which carries the grids and electrolyte of the storage battery has handles 7' whereby the container and battery can be lifted out of the box A, and in so doing break connection between the contact plates 2 and 4 which form the terminal connector. In inserting and removing the container 6 the engaging surfaces of the tongues 3 and plate 4 are kept clean by wiping action, and the tongues are so designed that when the box is inserted they will be under considerable tension for insuring the best conducting contact. As there are a plurality of tongues the resistance to the flow of current from one connector plate to the other is reduced to a negligible amount. The upper end of the connector plate 2 is bent laterally and terminates in an ear 7 having a curled portion or eye 8 to receive the end 9 of a cable or circuit wire. The ear 7 extends out of an opening 10 in the end of the box A, whereby the plate 2 is effectively held in place. The upper and lower ends of the connector plate 4 are bent laterally and extend through openings 11 and 12 in the end wall 5 of the container, and the upper extremity is formed into a connector ear 14 for connection with a lug 15 of one of the grid groups of the battery. The lower end 16 of the plate 4 is bent backwardly so as to hold it effectively in place. The bend 17 formed at the lower end of the plate 4 insures the ready passage of the plate 4 over the spring contacts 3, as the battery is being inserted in the box A. To insure always the proper placing of the battery in the box, the terminal connector plates 2 and 4 are to one side of the longitudinal center line of the box.

A battery and box constructed as shown and described has certain advantages, such as easy removal or insertion of the battery without requiring wires to be detached or connected, tools to be used, or liability to accidental short circuits or grounding, and no parts capable of becoming loose, and furthermore the best kind of electrical connection is obtained by the self-cleaning spring contact tongues, and it is to be noted that the cables do not have to be disturbed in taking out the battery, and it is impossible to insert the battery in a wrong way. The container 6 in the present instance is shown as made of wood, but if made of metal the plates 4 will of course be insulated therefrom.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A storage battery comprising a container having apertures in a wall thereof, a battery of cells in the container, and a metal plate outside the container and having its ends bent into the apertures of the said wall and one end directly connected with one terminal of the battery, in combination with a box having an apertured wall, and a plate on the inner surface of the apertured wall of the box and having one extremity extending out of the aperture to form a lug for receiving the circuit wire, said last-mentioned plate being formed with a plurality of spring tongues all having free extremities lying in substantially the same plane and bearing against the first-mentioned plate under tension for forming an electrical connection.

2. A storage battery comprising inner and outer boxes, plates disposed respectively on the inner and outer surfaces of opposing walls of the boxes, the wall of the inner box having apertures for receiving the extremities of the associated plate, and the said extremities being bent at the inside on the inner box to permanently fasten the plates in place, and a battery of cells within the inner box and having a terminal directly connected with one of the inwardly extending extremities of the plate on the inner box, one of the plates having spring tongues pressed out therefrom and all bearing in electrical connection with the other plate.

3. A battery comprising a container, a battery of cells in the container, and connector plates each having upper and lower extremities extending through the walls of the container, and the extremities being bent at points within the container for permanently holding the plates in place, and one extremity of each plate having an aperture in which engages one of the terminals of the battery of cells.

4. In a storage battery, the combination of a box open at its top, plates on the inner surfaces of the box at opposite ends, and the upper ends of the plates being bent outwardly through apertures and terminating in lugs, and circuit wires connected with the lugs, with a container, a battery of cells therein, and plates on the outer surfaces of the container at the ends, and the lower extremities of the last-mentioned plates being bent inwardly through apertures in the walls of the container, the plates of the container and box being disposed to one side of a center plane, whereby the container can be inserted operatively only in one way, one set of plates being formed with a plurality of spring tongues all bearing in conducting contact with the associated plate, whereby the battery of cells will be automatically connected with or disconnected from the circuit wires by the insertion or removal of the container.

5. In a storage battery, means for connecting a terminal post of the battery with an outside circuit, comprising a pair of contact plates, one plate having a plurality of spring tongues stamped out therefrom and arranged to bear against the other plate, both plates having an extremity bent laterally into a lug, one lug being apertured to fit a terminal post and thereby form a direct connection with the battery, and the other lug being shaped to clamp around a circuit wire.

In testimony whereof I have signed my name to this specification in the presence of two subscribing witnesses.

FRANK D. SHINDEL.

Witnesses:
CLAYTON LAUT,
W. T. KLEPPINGER.